US006443052B1

(12) United States Patent
Garber et al.

(10) Patent No.: US 6,443,052 B1
(45) Date of Patent: *Sep. 3, 2002

(54) HOUSEHOLD ELECTRIC COOKING APPLIANCE AND APPARATUS FOR ASSEMBLING AND STORING THE APPLIANCE

(75) Inventors: Alan M. Garber, Richmond, VA (US); Phillip L. Brookshire; David L. Slayton, both of Cincinnati, OH (US); Lawrence M. Pillion, Glen Allen; Stacey R. Just, Richmond, both of VA (US)

(73) Assignee: Hamilton Beach/Proctor-Silex, Inc., Glen Allen, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 83 days.

(21) Appl. No.: 09/255,419

(22) Filed: Feb. 22, 1999

(51) Int. Cl.⁷ .................................................. A47J 37/06
(52) U.S. Cl. ............................. 99/339; 99/340; 99/422; 99/426; 219/432; 219/433
(58) Field of Search .................. 99/422, 339, 425, 99/340, 426, 449, 403, 357; 219/432, 433, 438

(56) References Cited

U.S. PATENT DOCUMENTS

| 907,154 A | 12/1908 | Lewis | |
|---|---|---|---|
| 2,253,927 A | * 8/1941 | Butler et al. | 219/433 |
| 2,605,382 A | * 7/1952 | Kircher et al. | 219/433 |
| 2,978,564 A | * 4/1961 | Blanding et al. | 219/433 |
| 3,681,568 A | * 8/1972 | Schaefer | 219/432 |
| D230,935 S | 3/1974 | Lloveras | D7/94 |
| 4,013,869 A | * 3/1977 | Orts | 219/432 X |
| D247,946 S | 5/1978 | Painter et al. | D7/94 |
| D250,626 S | 12/1978 | Scott | D7/94 |
| 4,210,072 A | 7/1980 | Pedrini | 99/340 |
| 4,544,818 A | * 10/1985 | Minamida | 99/422 X |
| 5,656,188 A | 8/1997 | Janowiak et al. | 219/438 |

FOREIGN PATENT DOCUMENTS

CH 0604652 * 9/1978 .................. 99/422

OTHER PUBLICATIONS

Good Housekeeping, Dec. 1973, p. 136, "Table Range", by Corning.
House and Garden, May 1973, p. 156, "Lazy Day Slo-Cooker", by West Bend.
See Information Disclosure Statement regarding offer for sale less than one year before filing of this application.
Front and rear covers and pp. 250–253 of "96–97 Jewelry, Gift and Home Catalog" published by Service Merchandise Co., Inc.
Fron and rear cover and pp. 200 & 201 of "General Merchandise Catalog 1990/1991" published by Best Products Co., Inc.

* cited by examiner

*Primary Examiner*—Reginald L. Alexander
(74) *Attorney, Agent, or Firm*—Roger S. Dybvig

(57) ABSTRACT

A household electric appliance has three basic components, a griddle, a skillet which can be placed on the griddle to be heated thereby when the griddle is not otherwise in use, and a skillet lid which can be placed atop the skillet. The appliance can be compactly assembled for storage by changing the manner in which the components are stacked. When compactly assembled for storage, the three basic components can be clamped together and stored on edge to conserve lateral storage space. Two types of clamps are described, a resilient strap clamp and a wire rod clip. Operation of the appliance is controlled by a thermostat and a heating control panel is provided that has two sets of indicia, one for use when the griddle is used by itself and one for use when the skillet is used.

21 Claims, 7 Drawing Sheets

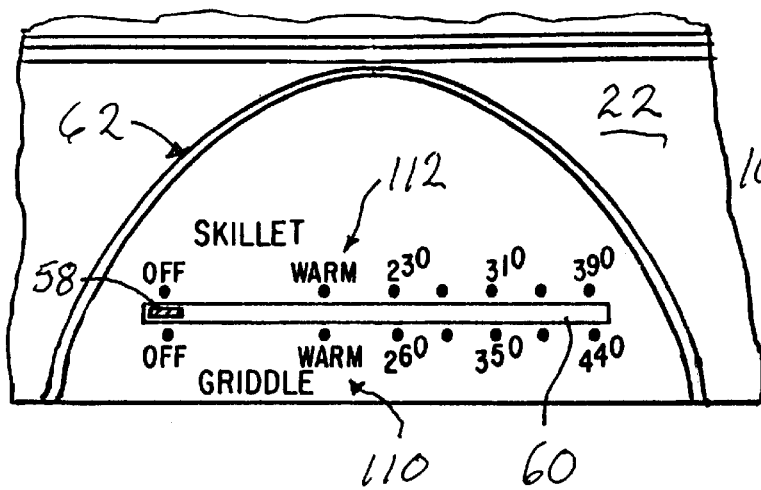
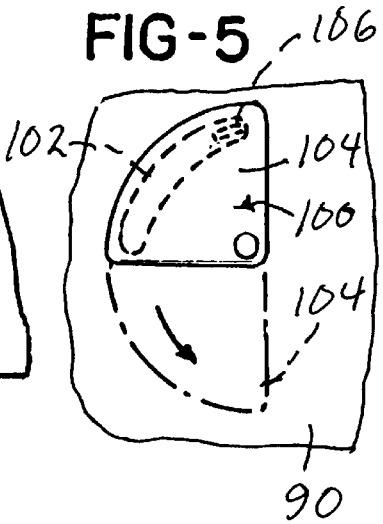
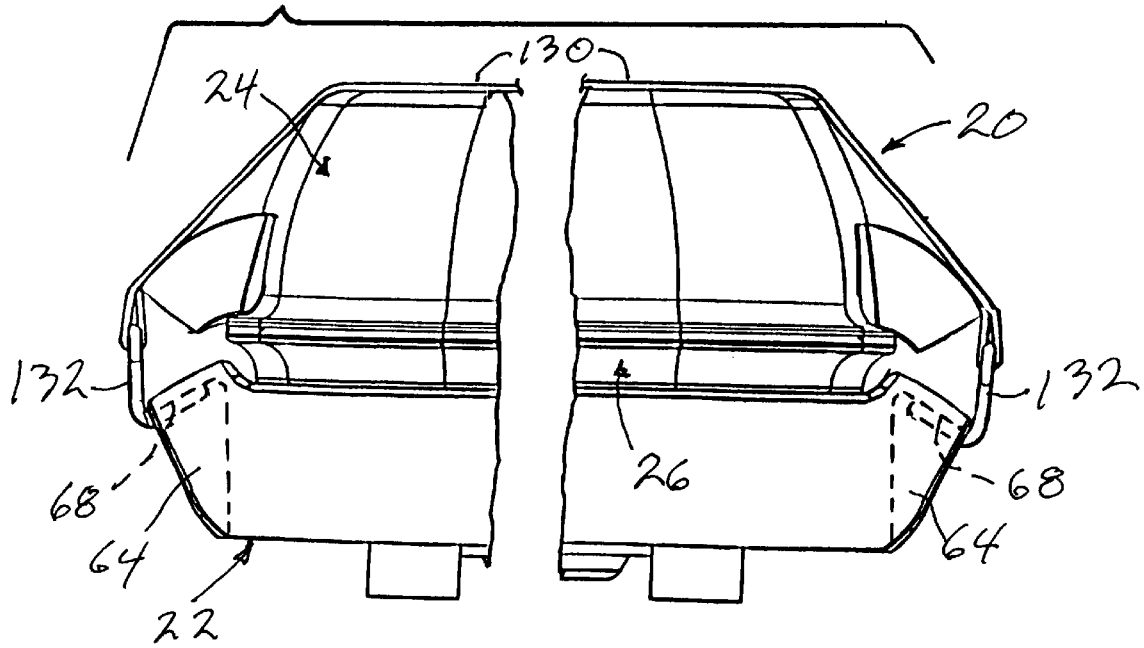
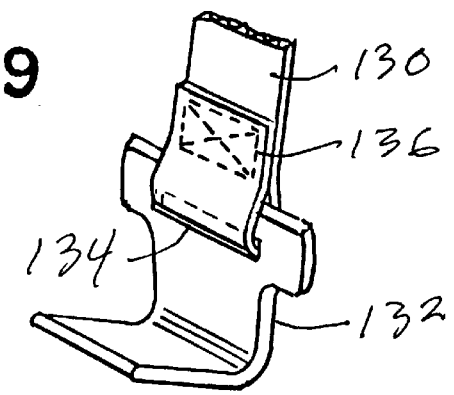

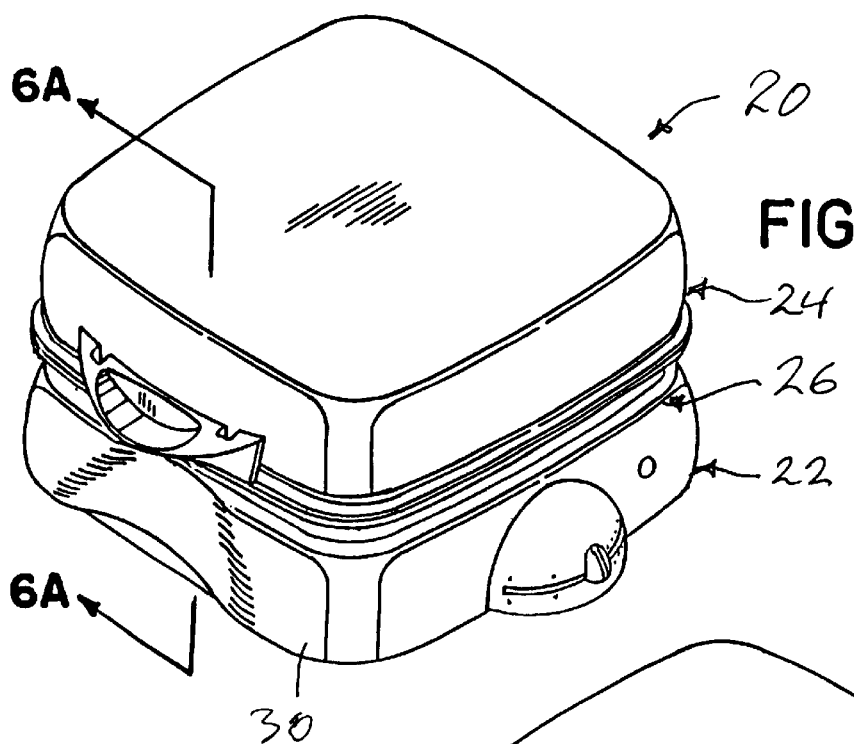
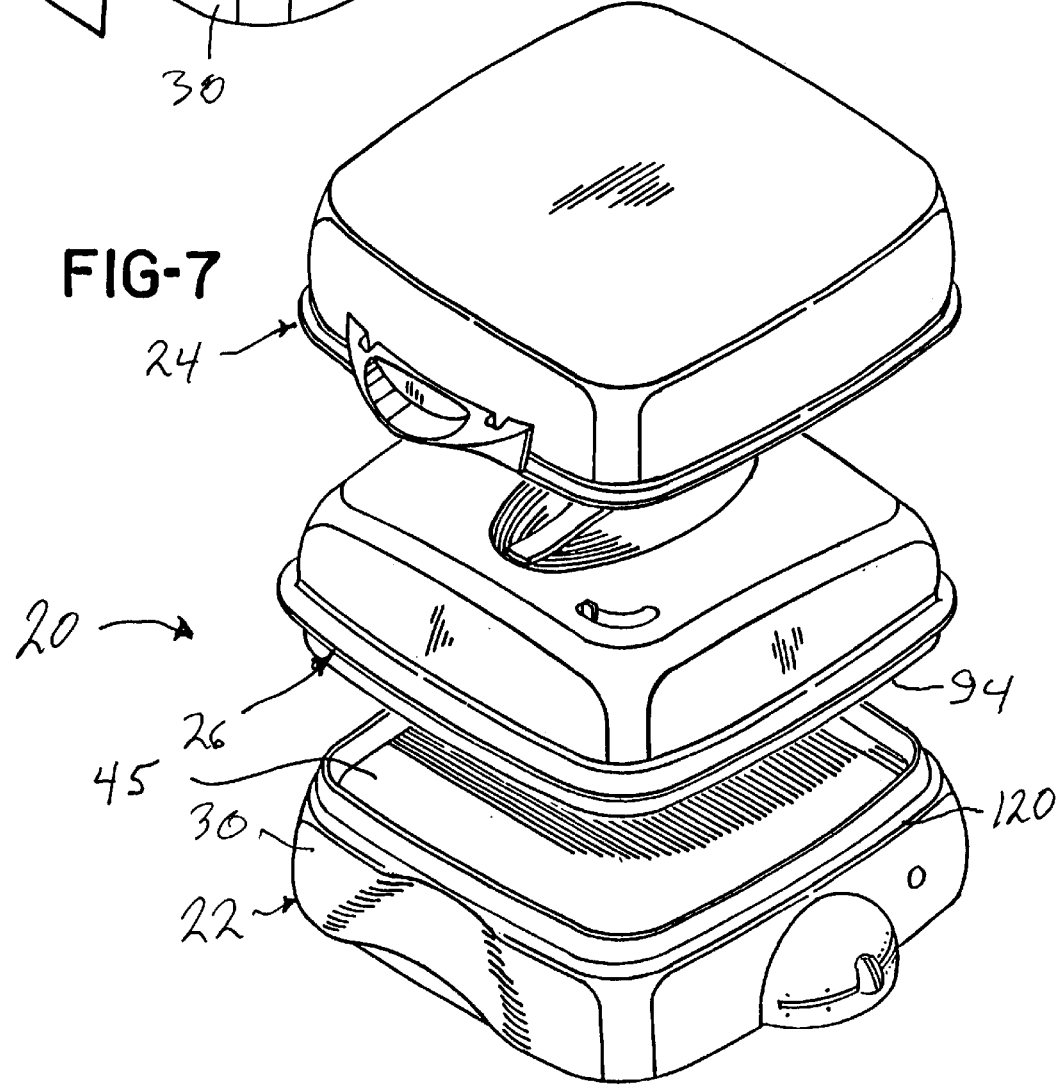

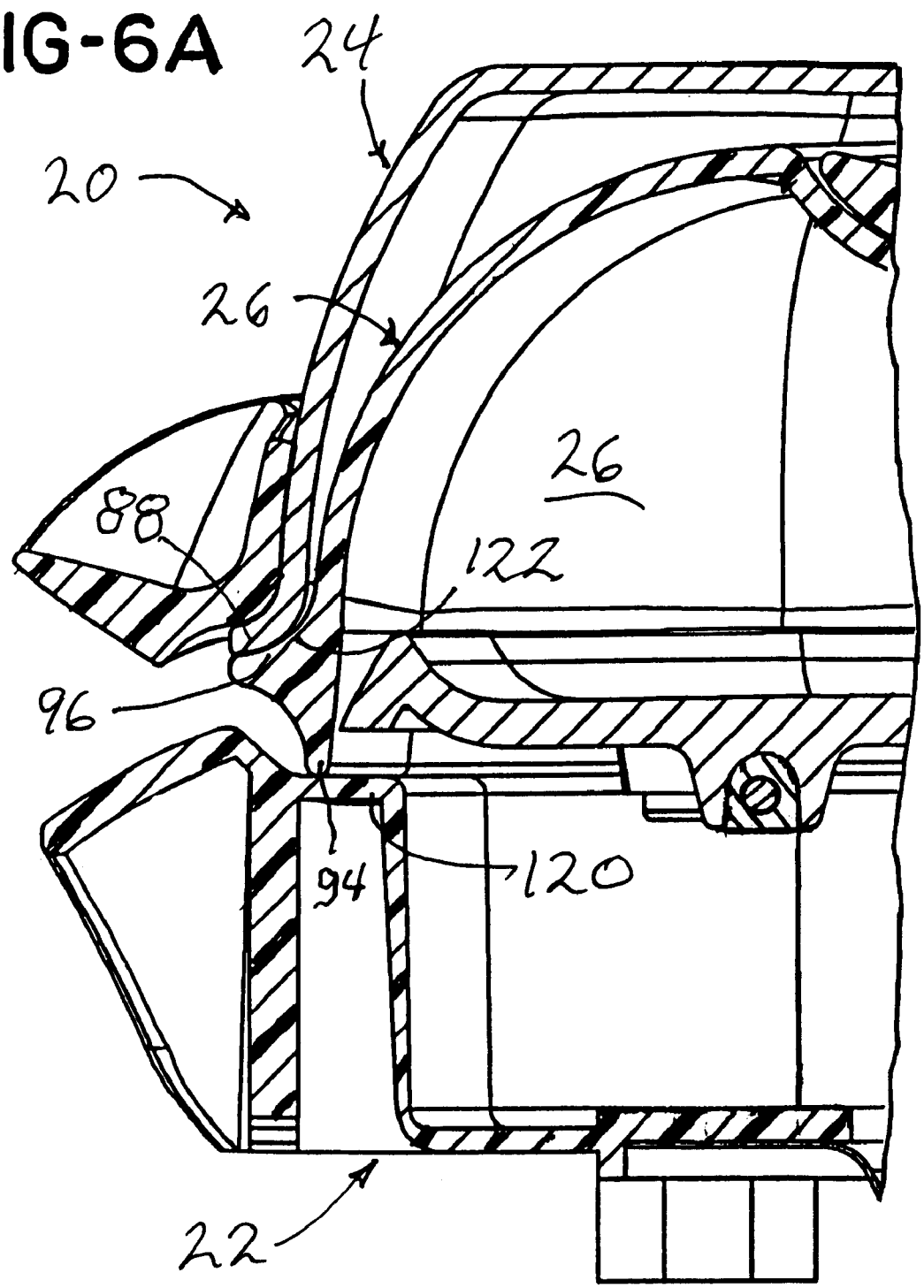

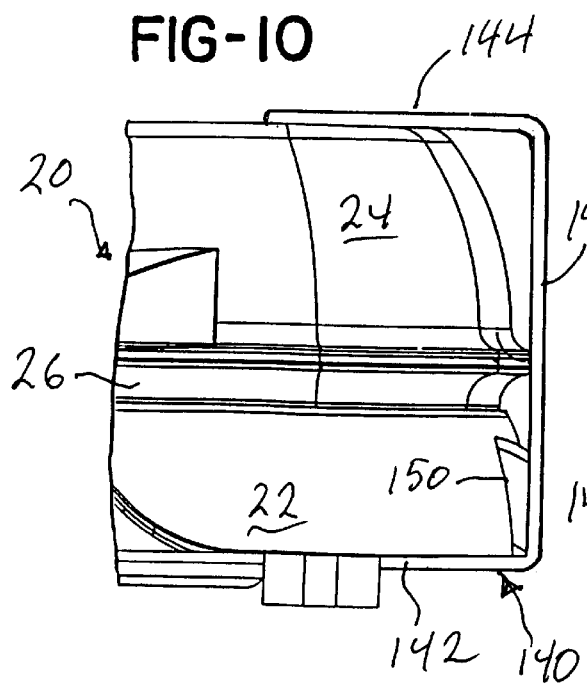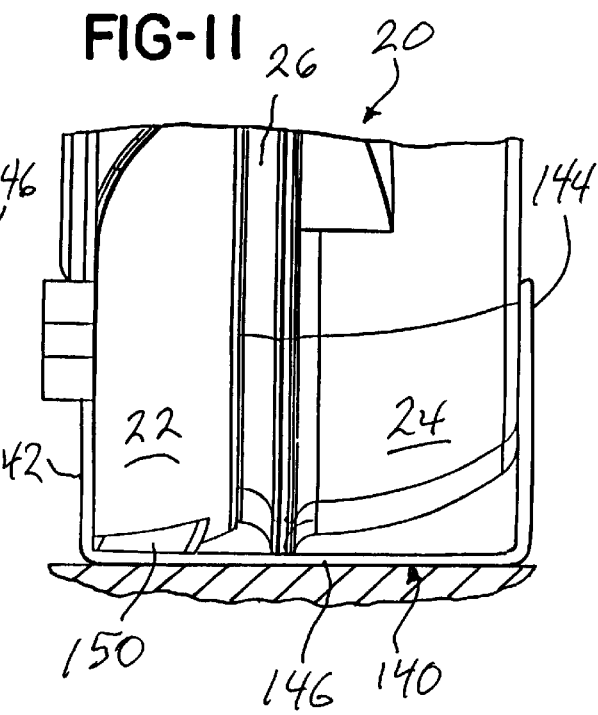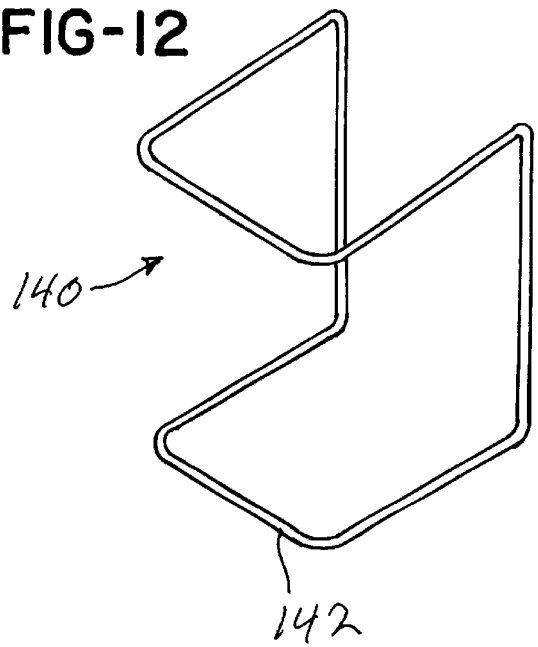

HOUSEHOLD ELECTRIC COOKING APPLIANCE AND APPARATUS FOR ASSEMBLING AND STORING THE APPLIANCE

FIELD OF THE INVENTION

This invention relates to a household electric cooking appliance and particularly to a household electric cooking appliance which can be used for two different functions, namely for use as a griddle and for use as a skillet. This invention also relates to a method and apparatus for assembling and storing the appliance.

BACKGROUND OF THE INVENTION

A large number of household electric kitchen appliances are available and in use in modern household kitchens. The number of electrical appliances has increased to the point that the available kitchen counter and storage space is often scarce. Household electric griddles and electric skillets are highly efficient and have become commonplace. Electric griddles and electric skillets serve different cooking functions. Griddles and skillets also require kitchen counter space and space for storage.

SUMMARY OF THE INVENTION

An object of a first aspect of this invention is to provide a household electric appliance which can perform different cooking functions. More particularly, an object of this invention is to provide a single household electric appliance that can be used as a griddle or as a skillet.

A household electric appliance in accordance with the first aspect of this invention comprises three basic components: a griddle having an electrically-heated griddle plate, a skillet which can be placed on the griddle to be heated thereby when the griddle is not otherwise in use, and a skillet lid which can be placed atop the skillet when needed. When all three basic components are in use, they form a stack with the griddle on the bottom, the skillet atop the griddle, and the skillet lid atop the skillet.

In a second aspect of this invention, an object is to provide a household electric griddle and skillet appliance that can be compactly assembled for storage on a kitchen cabinet shelf or on a kitchen counter so that the appliance has a relatively low overall height and can therefore be stored in a space having a limited vertical extent, such as under a low kitchen cabinet or in a relatively shallow cabinet compartment. A related object of this second aspect of this invention is to provide a method for compactly assembling the appliance.

A household electric appliance in accordance with the second aspect of this invention comprises the three basic components: a griddle having an electrically-heated griddle plate, a skillet which can be placed on the griddle to be heated thereby when the griddle is not otherwise in use, and a skillet lid which can be placed atop the skillet when needed. The three components have complementary shapes so that the following conditions apply:

1. The skillet and the skillet lid are sized and shaped to enable the skillet lid to be mounted on top of the skillet when the lid is in use.

2. The griddle has an upwardly facing surface for supporting the bottom rim of the skillet lid when the appliance is not in use.

3. The skillet lid can be partly housed within the skillet with the skillet inverted relative to the skillet lid so that the combined height of the skillet and the skillet lid for storage purposes is only slightly greater than the height of the skillet by itself.

With the foregoing conditions satisfied, the three basic components can be stacked with the skillet lid atop the griddle and the inverted skillet atop the skillet lid. The components stacked in this fashion form a stack which is substantially shorter than when the three components are in use at the same time. The stacking of the components in this fashion enables the appliance to be stored in a space having a shorter vertical extent than would be required if the components were stacked as they are when the skillet and the skillet lid are being used for cooking. Packaging and shipping costs can also be lowered by compactly assembling the basic components as described so that the appliance can be packaged in smaller boxes.

In a third aspect of this invention, an object is to provide a method and an apparatus by which an appliance assembled from multiple components stacked on top of one another can be stored on a side of the assembled components, so that the assembled components are vertically oriented and positioned side-by-side one another. If the height of the assembled appliance is less than its width and depth, storage of an appliance in this manner can be advantageous for storing the appliance in storage spaces which have adequate height and depth because of the reduced lateral or horizontal storage space occupied by the appliance.

A household electric appliance in accordance with the third aspect of this invention can comprise the three basic components compactly assembled for storage in accordance with the second aspect of this invention, and additionally provided with a clamp for holding the compactly assembled components together to form a substantially unitary module which can be stored on one of its sides. When stored in this fashion, the appliance can be stored on a counter or in a cabinet having a storage area with sufficient height and depth to receive the appliance while occupying only a minimal length of the storage area.

The clamp in accordance with this third aspect of this invention can comprise a resilient strap having hooks at its opposite ends for connecting the strap to oppositely located parts of the griddle and over the top of the skillet lid and the skillet. With the strap in place, a side of the appliance module thus created can be placed on a storage counter or shelf so that the basic components of the appliance are vertically oriented.

In another embodiment, the clamp could comprise a generally U-shaped clip that engages over the top and the bottom of the assembled components and having connecting portions extending along a side of the assembled components. The clip can function as a support rack, contributing to the support of the components in their vertical orientation. The clip need not necessarily hold the three basic components tightly but should prevent substantial separation of the assembled components.

The appliance of this invention preferably includes both types of clamps, the strap and the clip, which may optionally be used at the same time. For storing the appliance in accordance with this invention, the compact assembly method of the second aspect of this invention is preferably used and the assembled components then clamped together, using either one or both of the clamps to form a unitary module. The module thus formed is set on one of its sides in a storage area. When using both clamps, the clip can be placed upright on a storage surface. After forming the compact assembly, the strap can be connected to the assembled components as described above, and the module thus formed lowered into the clip.

In a fourth aspect of this invention, an object is to provide a temperature setting for the griddle when it is in use by itself and to provide a temperature setting for the skillet when it is in use. In accordance with this invention, a pivotal thermostat control lever having a control knob is used with two sets of indicia, an upper set and a lower set. The lower set of indicia is marked with temperature settings for the griddle and the upper set is marked with temperature settings for the skillet. The thermostat control lever extends through a horizontal slot and the two sets of indicia are preferably respectively located above and below the horizontal slot.

Other objects and advantages will become apparent from the following description and the accompanying drawings.

BRIEF DESCRIPTION OF THE DRAWINGS

FIG. 4 is a fragmentary front elevational view of a heating control panel forming part of the appliance of FIG. 1 and on a larger scale than FIG. 1. FIG. 4 also shows a thermostat control lever in cross section.

FIG. 5 is a bottom plan view of a steam release valve forming part of the appliance of FIG. 1.

FIG. 6 is a perspective view of the appliance similar to FIG. 1 but showing the appliance assembled to form a compact assembly for storage.

FIG. 6A is a fragmentary cross-sectional view of the appliance assembled as shown in FIG. 6 and taken along section line 6A—6A of FIG. 6.

FIG. 7 is a partly exploded perspective view similar to FIG. 2 but showing the appliance parts in the orientations thereof when compactly assembled for storage.

FIG. 8 is a fragmentary front elevational view of the appliance compactly assembled for storage and showing the basic components thereof clamped together by a clamping strap.

FIG. 9 is a fragmentary perspective view of a portion of the clamping strap including one of two hooks by which the clamping strap can be connected to the griddle.

FIG. 10 is a fragmentary front elevational view of the appliance compactly assembled for storage and showing the basic components thereof held assembled together by a clip.

FIG. 11 is a fragmentary front elevational view of the appliance compactly assembled for storage, held by the clip, and standing on one of its sides.

FIG. 12 is a perspective view of the clip of FIGS. 10 and 11.

DETAILED DESCRIPTION

Figure 1:
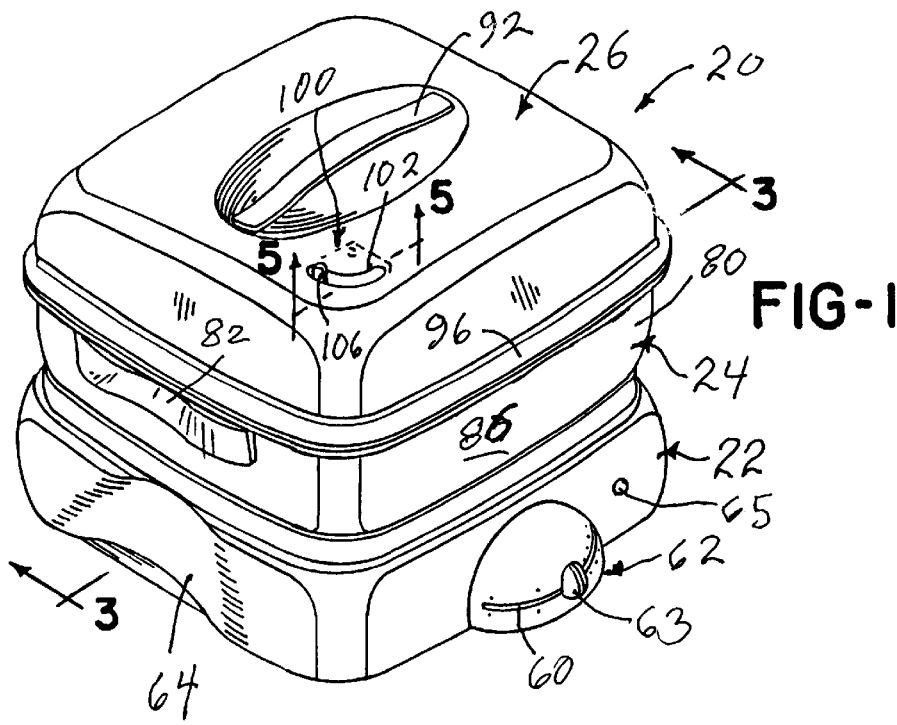
FIG. 1 is a perspective view of a household electric cooking appliance in accordance with this invention.
Figure 2:
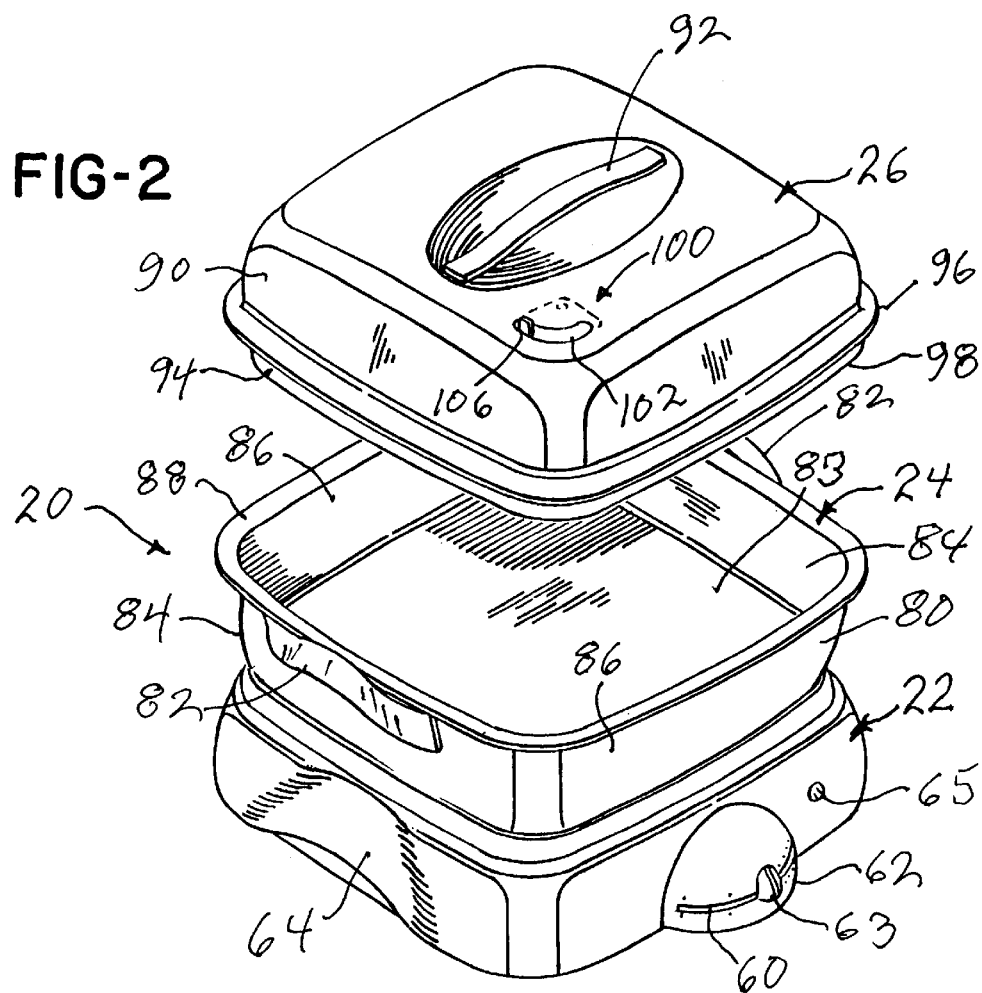
FIG. 2 is a partly exploded perspective view of the appliance of FIG. 1.
Figure 3:
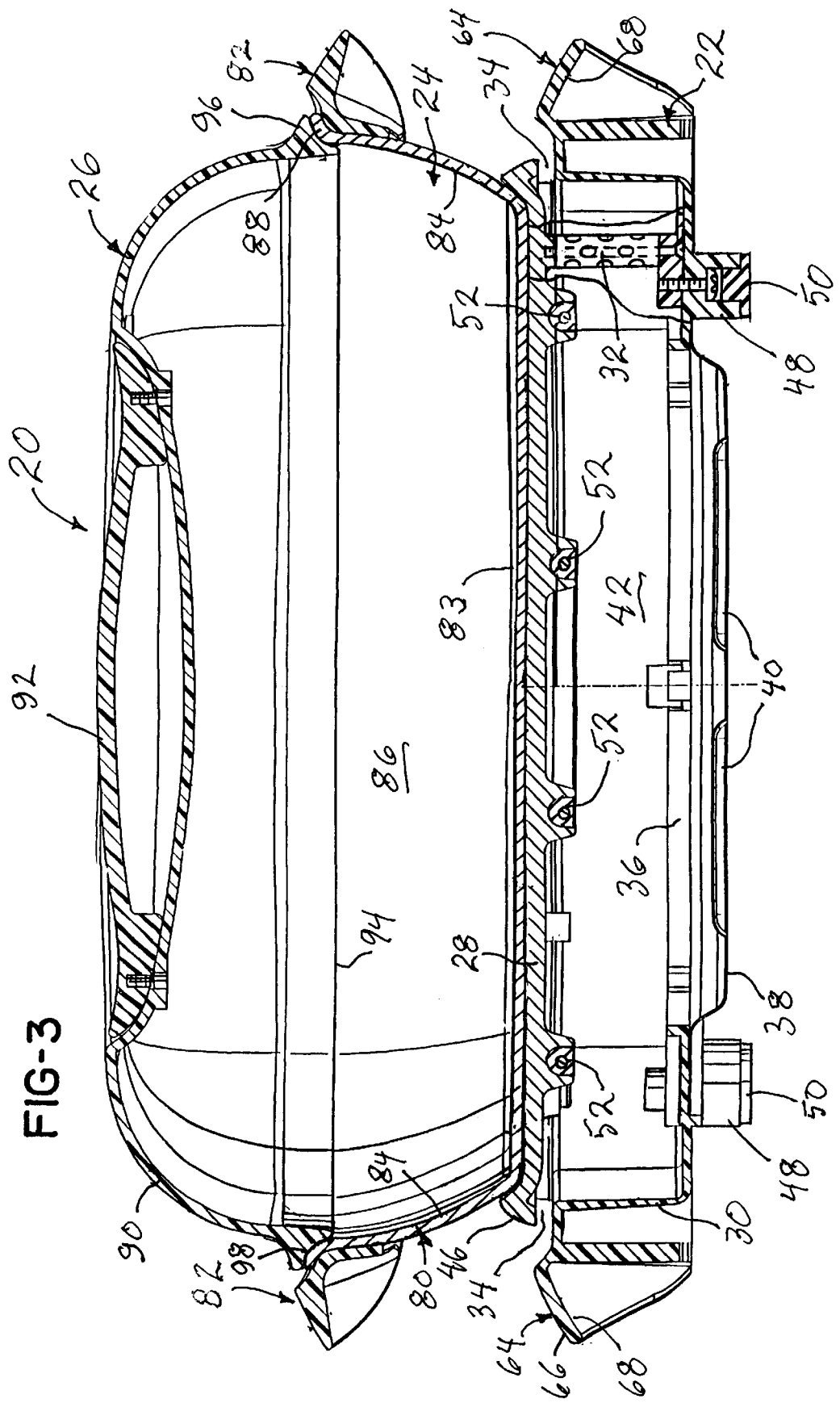
FIG. 3 is simplified cross sectional view of the appliance taken along section line 3—3 of FIG. 1.

With reference to FIGS. 1, 2 and 3, a household electric cooking appliance, generally designated 20, in accordance with this invention comprises three basic components, a griddle 22, a skillet 24 and a skillet lid 26.

The griddle 22 is provided with a horizontal griddle plate 28 which is sized and shaped to interfit with the skillet 24 and the skillet lid 26. Griddle plate 28 is mounted on a griddle base 30 as by plural stanchions 32, only one of which is shown in FIG. 3, at a height which provides an air gap 34 between the outer margins of the griddle plate 28 and the top of the griddle base 30. Griddle base 30 preferably comprises a molded plastic body having a central opening 36 covered by a sheet metal panel 38. Openings or louvers 40 formed in the panel 38 and openings (not shown) in adjacent portions of the griddle base 30 admit ambient air into the chamber, designated 42, below the griddle plate 28. The admitted air flows upwardly through the chamber 42 and outwardly through the air gap 34 and thereby prevents the building up of excessive heat in the griddle base 30.

Figure 13:
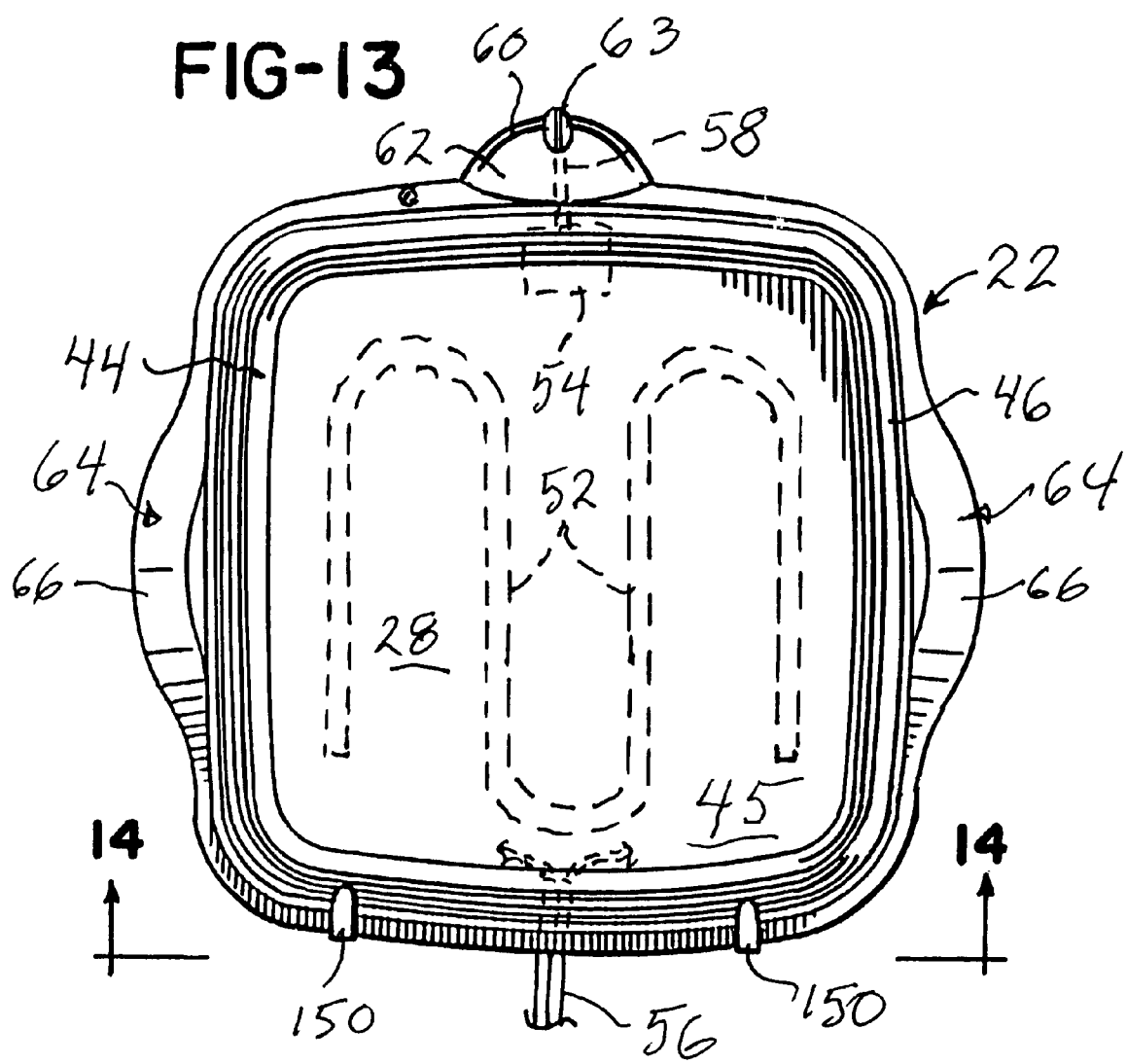
FIG. 13 is a partly diagrammatic, partly fragmentary top plan view of the griddle of the appliance of FIG. 1.
Figure 14:
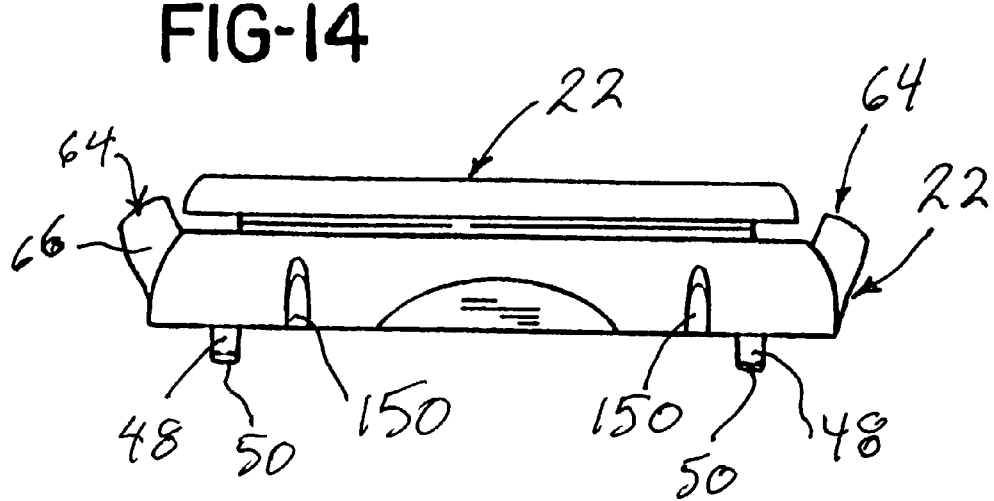
FIG. 14 is a rear elevational view of the griddle of FIG. 13, as viewed in the direction of arrows 14—14 of FIG. 13.

In the presently preferred practice of this invention, as best shown in FIGS. 13 and 14, the griddle plate 28 is generally square with gently curving, arcuately convex sides 44. The upper surface of the griddle plate 28 has a substantially planar cooking surface 45 bounded by an upwardly-projecting, low profile, inverted V-shaped, marginal flange 46 that forms the entire outer periphery of the griddle plate 28. In normal use, the griddle 22 is supported in a horizontal orientation by plural feet 48 which preferably are provided with non-skid elastomeric buttons 50 adapted to contact a kitchen counter or other supporting surface.

A sinuous calrod heating element 52 shown in cross section in FIG. 3 and in phantom in FIG. 13 is used to heat the griddle plate 28 under the control of an adjustable thermostat 54, shown diagrammatically in FIG. 13. The thermostat 54 is mounted on the bottom of the griddle plate 28 and connected to a source of household electric current by a power cord 56. Manual adjustment of the thermostat 54 is obtained by rotating a pivotal thermostat control lever 58 that projects outwardly through a horizontal-extending slot 60 in a heating control panel 62 at the front of the griddle 22. A heating control knob 63, shown in FIGS. 1 and 2, for example, is mounted on the outer, free end of the control lever 58. The knob 63 is not shown in FIG. 4 in order to better illustrate temperature indicating indicia on the control panel 62, as will be further described below. The circuit for heating the griddle plate 28 can be entirely conventional and is not further described herein. Preferably the circuit includes a neon lamp 65 visible from the front of the griddle base 30 which is lit whenever the heating element 52 is energized.

Griddle 22 is a fully functional household electric appliance by itself and can be used as one would use a conventional griddle, such as for preparing pancakes or frying eggs. A pair of mutually-spaced griddle handles 64 are integrally molded to the opposite sides of the griddle base 30. Each griddle handle 64 includes a finger-engageable plate portion 66 that extends over a downwardly-opening handle cavity 68. One using the griddle 22 can easily lift the griddle 22 by inserting their fingers into the handle cavities 68 and lifting upwardly against the bottom surfaces of the handle plate portions 66.

Returning again to FIGS. 1, 2 and 3, the skillet 24 comprises a pan 80 and mutually oppositely-extending and spaced handles 82 connected to the pan 80 by screws (not shown). Pan 80 has a flat bottom wall 83 which is substantially square but for sides which curve convexly outwardly to approximate the shape of the planar cooking surface 45 of the griddle plate 28. The skillet pan 80 also includes upwardly and outwardly sloping walls 84 and 86 that join one another at rounded corners. Walls 84 are considered to be sidewalls because the skillet handles 82 are mounted thereon. Walls 86 are considered to be front and back walls. To enhance the engagement between the skillet 24 and the skillet lid 26, as will be described below, an outwardly and upwardly sloping flange or lip 88 extends around the entire periphery of the top of the pan 80 along the uppermost edges of the walls 84 and 86.

In use, the skillet 24 is placed on top of the horizontal planar portion of the griddle plate 28. When the griddle 22 is energized, foods to be heated in the skillet are heated by the conduction of heat from the griddle plate 28 through the bottom wall 83 of the skillet pan 80. Of course, the griddle 22 can be energized either before or after the skillet is placed thereon.

As shown best in FIG. 3, the bottom wall 83 of the skillet pan 80 is located within the inside margins of the peripheral griddle plate flange 46. Accordingly, the griddle plate flange 46 prevents the skillet 24 from accidentally sliding laterally in any direction off the griddle plate 28.

With continued reference to FIGS. 1, 2 and 3, the lid 26 comprises a one-piece body member 90 to which a lid handle 92 is connected. The outer, bottom portion of the lid 26 has a generally square lower edge 94 of a size and shape complementary to the top of the skillet pan 80 to fit rather snugly inside the top of the skillet pan 80. In addition, the skillet lid 26 has a peripherally-extending flange 96 located slightly above the lower edge 94. The lid flange 96 is formed in part by a curved, downwardly facing, outer, skillet-engaging surface 98 that extends upwardly and outwardly from the lower lid edge 94. As shown best in FIG. 3, the skillet-engaging surface 94 of the lid 26 engages the skillet flange 88 at the top of the skillet 24 so that there is a substantial area of engagement between the skillet lid 26 and the skillet 24. Accordingly, when used, the lid 26 snugly engages the skillet 24.

The upper wall portion of the skillet lid 26 has an elongate, concave depressed portion to which the lid handle 92 is connected, as by the illustrated screws (FIG. 3). It will be noted that the lid handle 92 extends only slightly above the surrounding upper wall portions of the lid 26 so that the lid handle 92 does not appreciably add to the overall height of the lid 26.

With reference to FIGS. 1, 2 and 5, a steam vent 100 of conventional construction is provided. The vent includes a slot 102 in the upper wall of the lid 26 and a valve member 104 having a manually-accessible stem 106.

Referring to FIGS. 1, 2 and 4, the heating control panel 62 is provided with two sets of temperature-indicating indicia, namely a lower, griddle temperature-indicating indicia set 110 located below the horizontal slot 60 and an upper, skillet temperature-indicating indicia set 112 located above the slot 60. It will be observed that the lower indicia set 110 is marked with higher temperatures than the upper indicia set. This is because the lower indicia set 110 is used to set the thermostat 54 to the desired temperature of the griddle plate 28 when the griddle 22 is being used by itself. The upper indicia set 112 is used to set the thermostat 54 to the desired temperature of the skillet 24 when the griddle 22 is used as a support and a heat source for the skillet 24. The differences in the temperatures indicated by the two sets of indicia reflect the heat losses occurring when the bottom of the skillet 24 is being heated by the griddle plate 28. It will be noted that the leftmost indicia is "off" and the thermostat preferably includes an on/off switch. Of course the "off" position of the control lever 58 is the same for both sets of indicia 110 and 112.

FIGS. 6, 6a and 7 illustrate a preferred method for stacking the basic components of the appliance 20 for storage. In this method of stacking the basic components, the skillet lid 26 is assembled on top of the griddle 22 and the skillet 24 is inverted and stacked on top of the skillet lid 26.

In FIG. 6A it will be observed that the lower skillet lid edge 94 engages an upwardly-facing ledge 120 formed on the griddle base 30 that extends beneath and completely around the outside the outer margin of the griddle plate 28. Accordingly, the skillet lid 26 is supported in a stable position on the griddle base 30.

In addition, it will be noted in FIG. 6A that the skillet lid flange 96 has an upwardly-facing, curved outer surface 122 that is complementary to the skillet flange 88 so that the inverted skillet is supported in a stable position on top of the skillet lid flange 96. As evident, the overall height of the appliance 20 when stacked for storage in the manner illustrated in FIGS. 6, 6A and 7, is significantly shorter than when the appliance 20 is stacked during ordinary use, as illustrated in FIGS. 1, 2 and 3.

It will be noted that the abutting surfaces of the skillet 24 and its lid 26 include mating, complementarily curved surfaces that resist relative horizontal motion between them whether the appliance 20 is stacked for use as a skillet or stacked for storage. Accordingly, the stacked appliance 20 is resistant to being accidentally unstacked. In fact, all three basic components, the griddle 22, the skillet 24 and the skillet lid 26 are such that horizontal movements of the skillet 24 and the lid 26 in any direction are substantially resisted whether the appliance 20 is stacked for use as a skillet or stacked for storage. In this sense the appliance 20 advantageously has considerable stability.

One may observe that the skillet 24 and the lid 26 are so constructed that the appliance 20 could be rendered vertically compact by assembly of the skillet 24 and the lid 26 in ways other than shown in FIGS. 6, 6A and 7, provided that the top of the skillet lid is located within the skillet. Of course, the skillet and the skillet lid would be stacked on the griddle in every case. For example, the lid 26 could be inverted from the position thereof shown in FIG. 3 so that the bottom of the lid 26 faces upward and the lid 26 is mostly received within the skillet 24. However, the compact assembly shown in FIGS. 6, 6A and 7 is preferred because it is aesthetically pleasing and considered easier to handle than other assemblies. Moreover, the compactly assembled appliance 20, if stacked in the preferred manner, has a flat upper surface formed by the bottom wall 83 of the skillet 24. If the compactly assembled appliance 20 is stored in a horizontal orientation, other items could be stored atop its flat upper surface.

FIGS. 8 and 9 illustrate the clamping together of the griddle 22, the skillet 24 and the skillet lid 26 by the use of an elongate, resilient strap 130 which is provided with a hook 132 at each end. To assemble the strap onto the appliance 20, one of the hooks 132 is inserted into the griddle handle cavity 68 of one of the griddle handles 64 on one side of the griddle 22. The strap 130 is stretched over the top of the inverted skillet 24 and hooked onto the griddle handle 64 on the opposite side of the appliance 20 in the same manner. The parts of the appliance 20 are thereby clamped together and form a unitary module which is easy to handle and can conveniently be stored in confined storage areas as described above. FIG. 9 illustrates one method of connecting the hooks 132 to the ends of the strap 130. As evident, an end of the strap 130 is inserted through a slot 134 in the hook 132, looped back on itself and then connected to itself by stitching 136.

FIGS. 10, 11 and 12 illustrate the use of a U-shaped clip, generally designated 140, formed from stiff wire rod. The clip 140 has a first, griddle-engaging, U-shaped section 142 and a second, skillet-engaging, U-shaped section 144. Sections 142 and 144 are joined by a pair of mutually parallel support legs 146. Although the clip 140 may be used as a clamp, it need not tightly engage the appliance 20 provided that it prevents the basic components of the appliance 20 from becoming substantially separated. To store the compactly-assembled appliance 20 on edge, that is, with the griddle 22, the skillet lid 26 and the skillet 24 extending vertically as shown in FIG. 11, the clip 140 can be slipped over the back of the appliance 20, as shown in FIG. 10, and the appliance 20 can then be stood on the back wall surfaces thereof as shown in FIG. 11. Setting the appliance 20 on its back wall surfaces is preferred because the back walls of all three components form continuous, unbroken surfaces whereas the side wall surfaces of the griddle 22 and the skillet 24 are interrupted by the handles and the front wall of the griddle is interrupted by the control panel 62. Optionally, the clip 140 can be placed on a horizontal supporting surface with its sections 142 and 144 vertically oriented and the compactly-assembled appliance 20 lowered between the sections 142 and 144 and onto the support legs 146. The clip 140 can be used instead of the clamping strap 130 of FIGS. 8 and 9. Optionally, the clamping strap 130 can be assembled onto the compactly-assembled appliance 20 before the clip 140 and the appliance 20 are assembled together.

FIGS. 10 through 14 show pads 150 located along the back side of the griddle 22. Pads 150 are intended to contribute to the supporting of the appliance 20 in the manner shown in FIG. 11. In practice, the pads 150 may assist in placing the appliance 20 in the upright manner shown in FIG. 11. However, the appliance 20 may tend to tip over from its upright orientation so that the primary support for the appliance will more likely come from the clip 140 and, perhaps, the lower edge of the appliance 20. However, it should be noted that the appliance 20 can be placed in an upright orientation without the use of the clip 140 provided that the appliance is clamped by the strap 130 or other suitable clamp and can lean against a vertical surface, such as a cabinet sidewall. Of course, the griddle could be modified, such as by the provision of added pads 150 or by changing components such the the appliance 20 can be placed on one of its sides and remain erect without the use of a clip or other prop to maintain the erect position of the appliance 20.

Materials used in manufacturing the appliance 20 are not important to the practice of this invention. As presently preferred, the griddle plate 28 and the skillet pan 80 are made from aluminum. The upper surface of the griddle plate 28 and the entire skillet pan 80 are coated by a non-stick teflon coating or the like. The griddle base 30, the griddle handles 64, and the skillet handles 82 are molded from a phenolic resin. The skillet lid 26 is made from a high temperature thermosetting plastic resin and its handle 92 made from PBT resin. The steam vent valve is made from a polycarbonate material. Others familiar with the construction of cooking appliances will recognize that various materials different from those set forth above may be used.

The generally square shapes of the griddle 22, the skillet 24 and the skillet lid 26 illustrated in the drawings is presently preferred, but other shapes of these components, such as generally oval shapes, generally rectangular shapes other than square, irregular shapes, or generally round shapes, would also be satisfactory.

Although the presently preferred embodiment of this invention has been described, it will be understood that within the purview of the invention various changes may be made within the scope of the following claims.

Having thus described our invention, we claim:

1. A household electric cooking appliance comprising:
a griddle which is a fully functional household electric appliance by itself that can be used as one would use a conventional griddle, such as for preparing pancakes or frying eggs, said griddle comprising:
a base; and an electrically-heated griddle plate supported by said base in a horizontal position and capable of being used to cook foods thereon, said plate having an upper surface and an outer
said appliance further comprising:
a skillet comprising a pan having a bottom wall mountable on said griddle plate and heated by said griddle plate, said skillet further comprising side wall portions extending upwardly from the outer margin of said bottom wall.

2. The appliance of claim 1 wherein said plate has an upwardly-extending, low-profile flange adjacent to said outer margin and confining an upwardly-facing, planar cooking space on said upper surface.

3. The appliance of claim 2 wherein said bottom wall of said skillet is sized and shaped to be supported on said cooking space, said flange of said griddle plate resisting horizontal displacement of said skillet from said griddle area.

4. The appliance of claim 1 wherein said griddle further comprises a pair of mutually-spaced handles connected to said base.

5. The appliance of claim 1 wherein said skillet further comprises a pair of mutually-spaced handles connected to said side wall portions.

6. The appliance of claim 5 wherein said griddle further comprises a pair of mutually-spaced handles connected to said base.

7. The appliance of claim 1 further comprising a skillet lid having a top wall portion and side wall portions with lower margins sized to extend into said skillet so that said lid covers the top of said skillet and said sidewall portions of said skillet substantially prevent lateral movement of said lid.

8. The appliance of claim 7 wherein said lid further comprises a handle by which said lid may be conveniently grasped.

9. The appliance of claim 1 wherein said griddle further comprises an electric circuit for heating said griddle plate, said electric circuit comprising an adjustable thermostat for controlling the temperature of said griddle plate.

10. The appliance of claim 9 wherein said electric circuit includes a heating element on the underside of said griddle plate for heating said griddle plate.

11. The appliance of claim 10 wherein said electric circuit further comprises an electric power cord connected to said heating element, said power cord having a plug for connection to a source of household current.

12. A household electric cooking appliance comprising:
a griddle which is a fully functional household electric appliance by itself that can be used as one would use a conventional griddle, such as for preparing pancakes or frying eggs, said griddle comprising:
a base; and an electrically-heated griddle plate supported by said base in a horizontal position and capable of being used to cook foods thereon, said plate having an upper surface coated with a non-stick coating and an outer margin; and
said appliance further comprising:
a skillet comprising a pan having a bottom wall mountable on said griddle plate and heated by said griddle plate, said skillet further comprising side wall portions extending upwardly from the outer margin of said bottom wall, at least said bottom wall and the inside surfaces of said side wall portions of said skillet are coated by a non-stick coating.

13. A household electric cooking appliance comprising:

a griddle comprising:
- a base; and an electrically-heated griddle plate supported by said base in a horizontal position and capable of being used to cook foods thereon, said plate having an upper surface and an outer margin; and an electric circuit for heating said griddle plate including an adjustable thermostat for controlling the temperature of said griddle plate; and said appliance further comprising:
- a skillet comprising a pan having a bottom wall mountable on said griddle plate and heated by said griddle plate, said skillet further comprising side wall portions extending upwardly from the outer margin of said bottom wall;
- said base having a temperature control panel having an elongate horizontal slot, said thermostat having an adjusting lever extending through said slot, and said control panel having a first set of indicia to indicate temperatures to which said griddle plate is heated at different positions of said adjustment lever, and said control panel having a second set of indicia to indicate temperatures to which the skillet is heated when said skillet is supported on said griddle plate.

14. A household electric cooking appliance comprising:

a griddle comprising:
- a base; an electrically-heated griddle plate supported by said base in a horizontal position and capable of being used to cook foods thereon, said plate having an upper surface and an outer margin; said griddle base having an upwardly-facing surface beneath and extending completely around the outer margin of said griddle plate: and said appliance further comprising:
- a skillet comprising a pan having a bottom wall mountable on said griddle plate and heated by said griddle plate, said skillet further comprising side wall portions extending upwardly from the outer margin of said bottom wall; and
- a skillet lid having a top wall portion and side wall portions with lower margins sized to extend into said skillet so that said lid covers the top of said skillet and said sidewall portions of said skillet substantially prevent lateral movement of said lid the lower margin of said lid having a shape complementary to said griddle plate and defining a space slightly larger in area than said griddle plate so that said lid may be placed directly on said upwardly-facing surface of said base.

15. The appliance of claim 14 wherein said skillet may be inverted and placed on and supported by said lid when said lid is supported directly by said base.

16. The appliance of claim 15 wherein said lid further comprises an outwardly protecting peripheral flange spaced above said lower margins of said lid, said lid flange extending along the upper margin of said skillet; and wherein the outer margin of said skillet is sized and shaped to engage the upper margin of said lid flange when said skillet is inverted and placed on said lid.

17. The appliance of claim 16 wherein said appliance further comprises a clamp for holding said griddle, said skillet and said skillet lid in an assembled condition so that said appliance may be stored on one of its sides.

18. The appliance of claim 17 wherein said clamp comprises a resilient strap connected to spaced portions of said griddle.

19. The appliance of claim 18 wherein said spaced portions of said griddle comprise handles on the base of said griddle.

20. The appliance of claim 18 wherein said clamp comprises a clip made from a wire rod.

21. A household electric cooking appliance comprising:

a griddle which is a fully functional household electric appliance by itself that can be used as one would use a conventional griddle, such as for preparing pancakes or frying eggs, said griddle comprising:
- a base; and an electrically-heated griddle plate supported by said base in a horizontal position and capable of being used to cook foods thereon, said plate having an upper surface and an outer margin,
- said griddle further comprising an electric circuit for heating said griddle plate, said electric circuit comprising an adjustable thermostat for controlling the temperature of said griddle plate; and said appliance further comprising:
- a skillet comprising a pan having a bottom wall mountable on said griddle plate and heated by said griddle plate, said skillet further comprising side wall portions extending upwardly from the outer margin of said bottom wall;
- an adjustable thermostat for controlling the temperature of said griddle plate, said thermostat having an adjusting member and said griddle having indicia associated with said adjusting member indicating temperature settings for said griddle plate and indicia separately indicating temperature settings for said skillet when said skillet is supported by said griddle plate.

* * * * *